(12) United States Patent
Li et al.

(10) Patent No.: US 8,553,524 B2
(45) Date of Patent: *Oct. 8, 2013

(54) SIGNAL RECEPTION APPARATUS, SYSTEMS, AND METHODS

(75) Inventors: Qinghua Li, San Ramon, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 13/157,189

(22) Filed: Jun. 9, 2011

(65) Prior Publication Data

US 2011/0261760 A1    Oct. 27, 2011

Related U.S. Application Data

(63) Continuation of application No. 10/814,853, filed on Mar. 30, 2004, now Pat. No. 7,983,142.

(51) Int. Cl.
*H04J 11/00* (2006.01)
*H04J 3/06* (2006.01)

(52) U.S. Cl.
USPC ............ 370/208; 370/503; 375/260

(58) Field of Classification Search
USPC ........... 370/208–210, 319, 344, 480, 498, 370/503–521, 536, 542; 455/59–60, 101, 455/272, 562.1; 375/146–149, 260, 295
See application file for complete search history.

(56) References Cited

U.S. PATENT DOCUMENTS

| | | |
|---|---|---|
| 6,317,409 B1 | 11/2001 | Murakami |
| 7,352,718 B1 | 4/2008 | Perahia et al. |
| 2002/0150070 A1 | 10/2002 | Shattil |
| 2002/0154705 A1 | 10/2002 | Walton et al. |
| 2003/0072255 A1 | 4/2003 | Ma et al. |
| 2003/0112880 A1 | 6/2003 | Walton et al. |
| 2003/0123475 A1 | 7/2003 | Smyers |
| 2003/0156602 A1 | 8/2003 | Sage |
| 2003/0227985 A1 | 12/2003 | Schill et al. |
| 2003/0231700 A1 | 12/2003 | Alamouti et al. |
| 2004/0086027 A1 | 5/2004 | Shattil |
| 2004/0100897 A1 | 5/2004 | Shattil |

(Continued)

FOREIGN PATENT DOCUMENTS

| | | |
|---|---|---|
| EP | 1370017 A1 | 12/2003 |
| JP | 2003-124857 A | 4/2003 |

(Continued)

OTHER PUBLICATIONS

"International Standard ISO/IEC 8802-11 Part 11: Wireless LAN Medium Access Control (MAC) and Physical Layer (PHY) specifications," ANS/IEEE Std 802.11, First Edition 1999-00-00, Institute of Electrical and Electronics Engineers, Inc., New York, NY, (1999), pp. 123-137.

(Continued)

*Primary Examiner* — Habte Mered
(74) *Attorney, Agent, or Firm* — Schwabe, Williamson & Wyatt, P.C.

(57) ABSTRACT

An apparatus and a system, as well as a method and article, may operate to separate, in the frequency domain, a combined plurality of asynchronous data streams received at substantially the same time into a separated plurality of data streams, converting to the time domain for detection, synchronizing, and decoding.

20 Claims, 4 Drawing Sheets

(56) References Cited

U.S. PATENT DOCUMENTS

| | | |
|---|---|---|
| 2004/0120410 A1 | 6/2004 | Priotti |
| 2004/0184570 A1 | 9/2004 | Thomas et al. |
| 2006/0039312 A1 | 2/2006 | Walton et al. |
| 2006/0114812 A1 | 6/2006 | Kim et al. |

FOREIGN PATENT DOCUMENTS

| | | |
|---|---|---|
| TW | 0396702 | 7/2000 |
| TW | 0514738 | 12/2002 |
| TW | 0545006 | 8/2003 |
| TW | 0579160 | 3/2004 |
| WO | WO02/069552 A1 | 9/2002 |
| WO | WO2005/099210 A1 | 10/2005 |

OTHER PUBLICATIONS

Burg et al., "Low Complexity Frequency Domain Equalization of MIMO Channels with Applications to MIMO-CDMA Systems," Vehicular Technology Conference (VTC 2003), vol. 1, Oct. 6, 2003, pp. 468-472.

Wu et al., "Multiple Phase Noise Correction for OFDM/SDMA," IEEE Global Telecommunications (GLOBECOM 2003), vol. 7(7), Dec. 1, 2003, pp. 1311-1315.

Ogawa et al., "A MIMO-OFDM System for High-Speed Transmission," Vehicular Technology Conference, Graduate School of Engineering, Hokkaido University, Sapparo, Japan, pp. 493-497, 2003.

Office Action issued May 22, 2009 from Chinese Patent Application No. 200580010728.1.

Office Action issued Jun. 4, 2010 from Chinese Patent Application No. 200580010728.1.

Office Action issued Nov. 4, 2010 from Chinese Patent Application No. 200580010728.1.

Office Action issued Aug. 17, 2011 from Chinese Patent Application No. 200580010728.1.

Office Action issued Aug. 27, 2009 from European Patent Application No. 05726150.5.

Search Report issued May 31, 2010 from Malaysian Patent Application No. PI 20051389.

International Search Report mailed Jul. 29, 2005 from International Application No. PCT/US2005/010136.

Office Action issued Aug. 10, 2006 from Taiwan Patent Application No. 94109619.

Office Action issued Sep. 22, 2008 from Taiwan Patent Application No. 94109619.

Notice of Allowance issued Jan. 23, 2009 from Taiwan Patent Application No. 94109619.

SIGNAL RECEPTION APPARATUS, SYSTEMS, AND METHODS

RELATED APPLICATION

This application is a continuation of, and claims priority to, U.S. application Ser. No. 10/814,853 entitled "Signal Reception Apparatus, Systems, and Methods," filed Mar. 30, 2004 and issued as U.S. Pat. No. 7,983,142 on Jul. 19, 2011. Said application is hereby incorporated by reference in its entirety.

TECHNICAL FIELD

Various embodiments described herein relate to digital communications generally.

BACKGROUND INFORMATION

In some spatial-division multiple-access (SDMA) communications systems, the SDMA uplinks may be assumed to be synchronous, such that symbols arriving from different data streams align according to timing boundaries. However, the potential 4 microsecond symbol timing error permitted by some Institute of Electrical and Electronics Engineers (IEEE) 802.11 standards is longer than the 0.8 microsecond guard interval specified in the 802.11a standard. Therefore, SDMA uplink communications conducted under these conditions may actually be asynchronous, and, not synchronous as assumed. Similar problems may occur when SDMA radios conforming to IEEE 802.16 standards are used.

For more information regarding various IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments. For more information regarding IEEE 802.16 standards, please refer to "IEEE Standard for Local and Metropolitan Area Networks—Part 16: Air Interface for Fixed Broadband Wireless Access Systems, IEEE 802.16-2001", as well as related amendments and standards, including "Medium Access Control Modifications and Additional Physical Layer Specifications for 2-11 GHz, IEEE 802.16a-2003".

DETAILED DESCRIPTION

In some embodiments, a combined plurality of asynchronous data streams may be received as an SDMA communication signal in the time domain. The received signal may be converted from the time domain into the frequency domain, and then separated in the frequency domain to provide a separated plurality of data streams. In some embodiments, a spatial demapper operating in the frequency domain (e.g., a "frequency spatial demapper" included in a separation module) may be used to assist in separating the combined asynchronous data streams into the separated plurality of data streams.

Conventional spatial demappers are designed to operate in situations where transmitted signals from various users arrive synchronously at the receiving antenna(s). Thus, when signals arrive asynchronously, receivers including conventional demappers tend to malfunction. This is because separating asynchronous user signals in the time domain is a complex task, while separation in frequency domain, accomplished using the apparatus, systems, and methods disclosed herein, is relatively easy. Thus, the frequency spatial demapper included in some embodiments may operate in the frequency domain, and its output may be converted back into the time domain.

For the purposes of this document, "asynchronous data streams" include any two or more data streams that have individual, time-sequenced segments or symbols wherein at least one of the data streams includes at least some segments/symbols having beginning and/or ending timing boundaries that do not align with similar beginning and/or ending timing boundaries of at least some segments/symbols included in another of the data streams. For example, the symbols may not be aligned due to differences in allowable timing error (e.g., 4 microseconds) versus allowable guard band specifications (e.g., 0.8 microseconds), such that like beginning/ending boundaries are out of synchronism by a time period greater than the allowed guard band time period.

A "data stream" may include one or more signals including data transmitted by a single user via one or more antennas, perhaps with different phases and delays. The number of antennas used to receive multiple data streams may not be equal to the number of data streams, and in some embodiments, may be greater than the number of data streams. For the sake of simplification, it will be assumed throughout this disclosure that P data streams arrive asynchronously at Q receive antennas, and that Q is typically greater than P (although in some embodiments Q may be less than or equal to P).

The term "energy conduit" includes any type of device or apparatus that has the capability to transmit and/or receive energy to and/or from space. Examples of such energy conduits include antennas, infra-red transmitters, infra-red receivers, photo-emitters (e.g., light emitting diodes), photo-receptors (e.g., a photocell), and charge-coupled devices, among others.

The term "transceiver" (e.g., a device including a transmitter and a receiver) may be used in place of either "transmitter" or "receiver" throughout this document. Thus, anywhere the term transceiver is used, "transmitter" and/or "receiver" may be substituted.

Figure 1A:
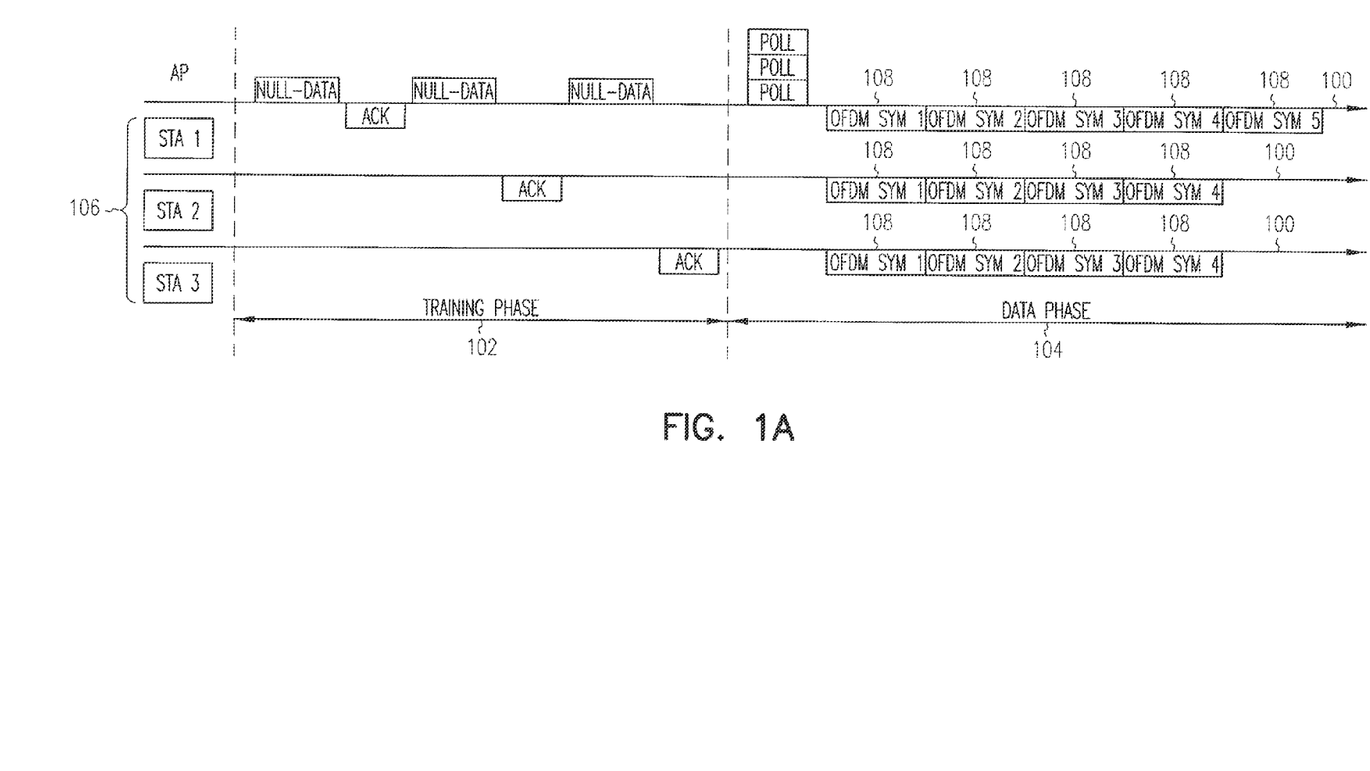
FIGS. 1A and 1B are exemplary representations of asynchronous data streams according to some embodiments.
Figure 1B:
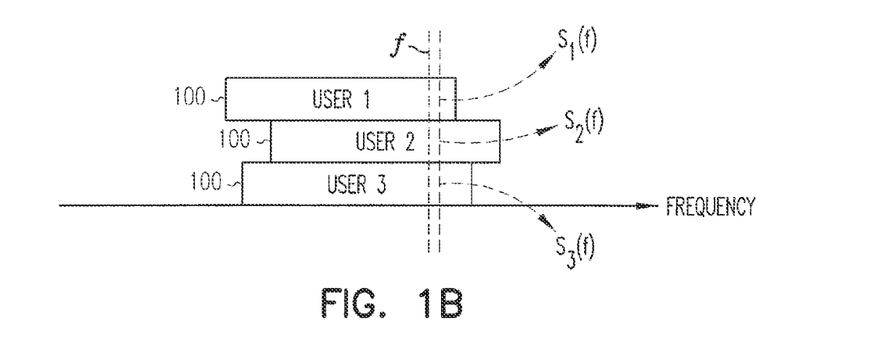

FIGS. 1A and 1B are exemplary representations of asynchronous data streams 100 according to some embodiments. In some embodiments, as might occur when one or more SDMA uplink data streams are formatted according to an 802.11 standard, such as the 802.11a standard, there can be two phases of communication: a training phase 102 and a data phase 104. In the training phase 102, an access point (AP) may learn the characteristics of spatial channels 106 associated with each station STA1, STA2, and STA3. In the data phase 104, the AP may poll the stations STA1, STA2, and STA3, and the stations STA1, STA2, and STA3 may respond by sending signals, including asynchronous data streams 100, to the AP at substantially the same time.

At this point, the AP may be able to exploit channel state information learned during the training phase 102 to separate the stations' superimposed signals including the asynchronous data streams 100.

Several factors may require consideration with respect to the cause of data stream 100 asynchronism. Among such causes may be:

(1) a conflict between the potential segment/symbol allowed timing error (e.g., about 4 microseconds in a IEEE 802.11 wireless local area network (WLAN)) and an allowed guard interval (e.g., about 0.8 microseconds for IEEE 802.11a). Thus the beginnings and ends of symbols 108 sent by the stations STA1, STA2, and STA3 may not be aligned in time. In the asynchronous case, one orthogonal frequency-division multiplexed (OFDM) symbol may be interfered with by 2*(K-1) OFDM symbols from K simultaneously operating stations STA1, STA2, and STA3, whereas the number of interfering symbols may be only (K-1) for the synchronous case (e.g., see FIG. 1A);

(2) the frequency offsets of the stations STA1, STA2, and STA3 may be different. That is, the sub-carriers of the stations STA1, STA2, and STA3 may be offset from some selected nominal frequency point by different amounts (e.g., see FIG. 1B); and (3) the phase offsets of the stations STA1, STA2, and STA3 during the training phase 102 and data phase 104 may be different.

In order to more completely understand the techniques disclosed herein, consider how OFDM symbols may be processed with an SDMA SISO (single-input, single-output) connection. Let $\tilde{m}_i$, $i=0, \ldots, N-1$ be the message to send, where N is the number of OFDM tones. In the time domain, the waveform may be expressed as:

$$m_n = \sum_{i=0}^{N-1} \tilde{m}_i e^{j2\pi f_i \frac{n}{N} T_m}, f_i = \frac{i}{T_m}, n = 0, \ldots, N-1.$$

Here $T_m$ represents the message length, such that in IEEE 802.11a and IEEE 802.11g, $T_m = 3.2$ μs, and N=64.

To combat the problem of inter-symbol interference (ISI), a cyclic prefix (CP) may be added to the message in the time domain. If the message time is $T_m$, and the CP time is $T_p$, the resulting symbol waveform may then be expressed as:

$$x_n = \begin{Bmatrix} m_{n+N}, & -p \leq n < 0 \\ m_n, & 0 \leq n < N \end{Bmatrix}, \text{ with } T_p = \frac{p}{N} T_m,$$

and the symbol time=$T_m + T_p$. For IEEE 802.11a and IEEE 802.11g, $T_p = 0.8$ μs. Symbols may be sent in serial fashion, as shown in FIG. 1A.

Multi-path interference may result in the superposition of multiple copies of the message, one on top of the other, as seen at a single receiving antenna. This type of received signal may be expressed as:

$$y_n = \sum_{k=0}^{L-1} h_k x_{n-k},$$

where L is the number of taps in channel response h. After discarding the first p samples, $y_n$ may be free of ISI if L<p.

However, it may still contain multiple copies of itself. If a Fourier transform is performed on the samples $y_n$, $n=0 \ldots N-1$:

$$\hat{m}_i = \frac{1}{N} \sum_{n=0}^{N-1} y_n e^{-j2\pi f_i \frac{n}{N} T_m}$$

$$= \frac{1}{N} \sum_{n=0}^{N-1} \sum_{k=0}^{L-1} \sum_{i'=0}^{N-1} h_k \tilde{m}_{i'} e^{j2\pi f_{i'} \frac{n-k}{N} T_m} e^{-j2\pi f_i \frac{n}{N} T_m}$$

$$= \left( \sum_{k=0}^{L-1} h_k e^{-j2\pi f_i \frac{k}{N} T_m} \right) \tilde{m}_i$$

$$= \tilde{h}_i \tilde{m}_i$$

and the known channel response $\tilde{h}_i$ may permit estimating the message $\tilde{m}_i$ from the received signal $y_y$.

Extending this method to P transmit antennas and Q receive antennas, the expression $\hat{m}_{k,i} = \tilde{h}_{kl,i} \tilde{m}_{l,i}$, $k=1, \ldots, Q$; $l=1, \ldots P$; $i=0, \ldots, N-1$ may hold if the incoming signal streams include aligned (e.g., synchronized) symbols. Sampling of the streams may then be chosen so that no ISI occurs for each stream.

In reality, an SDMA uplink message may be sent from several different stations having clocks that are not synchronized, and alignment error under IEEE 802.11 may be as great as 4 microseconds (e.g., the length of a complete OFDM symbol). In this case, for example, samples may pick up part of the CP associated with one symbol in a first stream, and part of a different symbol in a second asynchronous stream, introducing ISI and invalidating the relationship $$\hat{m}_{k,i} = \tilde{h}_{kl,i} \tilde{m}_{l,i}, k=1, \ldots, Q; l=1, \ldots P; i=0, \ldots, N-1.$$

It should be noted that even though this relationship may not hold for the message bits, it may be correct for general waveforms. If it is assumed that the nth sample received at the qth antenna is labeled $y_{q,n}$, then $$y_{q,n} = \sum_{k=0}^{L-1} h_{qp,k} x_{p,n-k}.$$

Performing a Fourier transform, we have:

$$\tilde{y}_{q,i} = \frac{1}{N} \sum_{n=0}^{N-1} y_{q,n} e^{-j2\pi f_i \frac{n}{N} T_m} = \tilde{h}_{qp,i} \tilde{x}_{p,i}.$$

As long as the rank of matrix $h_{qp}$ is larger than P, an inverse matrix can exist, so we may obtain:

$$\tilde{x}_{p,i} = inv(\tilde{h}_{qp,i}) \tilde{y}_{q,i},$$

separating the data stream in the frequency domain. Using an inverse Fourier transform, the waveform $x_{p,n}$ may be reconstructed by:

$$x_{p,n} = \sum_{n=0}^{N-1} \tilde{x}_{p,i} e^{j2\pi f_i \frac{n}{N} T_m},$$

such that SISO techniques may be applied to detect a symbol, synchronize the sample, remove the guard band, and apply a Fourier transform to obtain the message $\tilde{m}_{p,i}$.

This technique may not only operate to solve the problem of asynchronous data streams, but can also resolve different frequency offsets between an AP and multiple user stations (since the operations may be independent of frequency offset). After the asynchronous data streams are separated, each stream reception chain can track individual frequency offset for a designated receiver signal path. That is, compensation for frequency offset may be effected individually by processing each data stream according to conventional single user techniques.

Thus, the frequency spectra shown for stations USER1, USER2, and USER3 in FIG. 1B illustrate that by converting received signals into the frequency domain, operations may become independent of frequency offset variations. In this case, for example, the frequency spectra are offset by different amounts. However, since the frequency spatial demapper included in some embodiments is able to process the superimposed asynchronous data streams in the frequency domain, for a given frequency f, the frequency spatial demapper can recover the originally sent signals $S_1(f)$, $S_2(f)$, and $S_3(f)$. It should be noted that the frequency f may be located at different places with respect to different users' center frequencies, such that the difference in location reflects the difference in frequency offsets.

Figure 2:
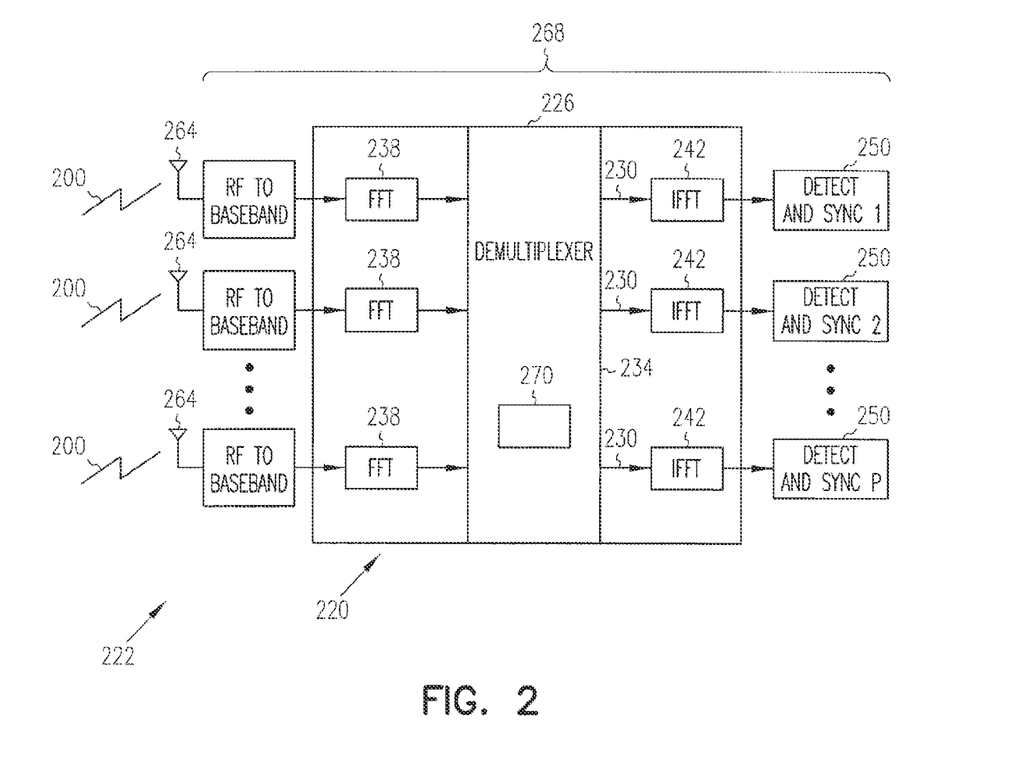
FIG. 2 is a block diagram of an apparatus and a system according to various embodiments.

FIG. 2 is a block diagram of an apparatus 220 and a system 222 according to various embodiments, each of which may operate in the manner described above. For example, an apparatus 220 may comprise a module 226 to separate (e.g., a separation module), in the frequency domain, a combined plurality P of asynchronous data streams 200 received at substantially the same time into a separated plurality of data streams 230. The module 226 may include a spatial demultiplexer 234 (e.g., a frequency spatial demapper, a linear demultiplexer that may implement zero-forcing and minimum mean square error (MMSE) equalization techniques, a nonlinear demultiplexer that may implement Vertical Bell Labs Layered Space-Time (V-BLAST) architecture, etc.) to provide the separated plurality of data streams 230.

In some embodiments, the module 226 to separate the data streams 230 may include one or more fast Fourier transform (FFT) modules 238 to perform an FFT on the combined plurality P of asynchronous data streams 200, as well as one or more inverse-FFT (IFFT) modules 242 to perform an IFFT on one or more of the separated plurality of data streams 230. The apparatus 220 may also include one or more synchronization modules 250 to receive at least one of the separated plurality of data streams 230 after processing by one or more of the IFFT modules 242. In some embodiments, one or more of the separated plurality of data streams 230 may be formatted according to any of several standards, including an IEEE 802.11 standard and/or an IEEE 802.16 standard. Numerous variations are possible.

For example, in some embodiments, an apparatus 220 may include one or more FFT modules 238 to perform an FFT on the combined plurality P of asynchronous data streams 200, a spatial demultiplexer 234 to provide a separated plurality of data streams 230 associated with the combined plurality P of asynchronous data streams 200, and one or more IFFT modules 242 to perform an IFFT on at least one of the separated plurality of data streams 230 so as to separate, in the frequency domain, the combined plurality P of asynchronous data streams 200 received at substantially the same time into the separated plurality of data streams 230. One or more of the separated plurality of data streams 230 may include a plurality of OFDM symbols (see FIG. 1A). In some embodiments, the frequency offset associated with a first data stream included in the separated plurality of data streams may be different from the frequency offset associated with a second data stream included in the plurality of separated data streams (see FIG. 1B). Other embodiments may be realized.

For example, in some embodiments, the data streams may be separated in the frequency domain, where channels are known from training. Then the waveforms of the data streams may be reconstructed in the time domain. Each stream may then be detected, synchronized, and samples selected without ISI, perhaps using detection and synchronization modules 250. Other embodiments may be realized.

For example, a system 222 may include an apparatus 220, similar to or identical to that described previously, as well as one or more antennas 264, including a plurality Q of antennas 264 to receive the combined plurality P of asynchronous data streams 200. The antennas 264 may include may different types, including patch, slot, PIFA (planar inverted f-antenna), omnidirectional, directional, monopole, dipole, etc. The antennas 264 may form a portion of a multiple-input, multiple-output (MIMO) system.

In some embodiments, a wireless access point 268 may be coupled to the plurality Q of antennas 264. The wireless access point 268 may be used to train one or more channels for one or more of a plurality of P users associated with the combined plurality P of asynchronous data streams. The system 222 may also include a processor 270 to form an SDMA Q×P channel matrix, known to those of skill in the art.

The asynchronous data streams 100, 200, training phase 102, data phase 104, spatial channels 106, symbols 108, apparatus 220, system 222, modules 226, 238, 242, 246, 250, separated data streams 230, spatial demultiplexer 234, antennas 264, wireless access point 268, processor 270, frequency f, signals $S_1(f)$, $S_2(f)$, $S_3(f)$, and stations STA1, STA2, STA3, USER1, USER2, USER3 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 220 and the system 222, and as appropriate for particular implementations of various embodiments.

It should also be understood that the apparatus and systems of various embodiments can be used in applications other than wireless access points, and thus, various embodiments are not to be so limited. The illustrations of an apparatus 220 and system 222 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

Various methods may be embodied by the disclosed techniques. For example, in some embodiments, a wireless access point may train each user's Q×1 channel (e.g., the first channel for each user), one by one, for all P users, and then a frequency response may be computed for each user's Q×1 channel. At this point, a Q×P channel matrix, known to those of skill in the art, may be formed for each frequency tone. The time domain signals of P users from Q antennas may then be converted from the time domain into the frequency domain, segment by segment. The size of a time domain segment may be determined by the sub-carrier spacing of a signal including OFDM symbols. For example, in a signal formatted according to IEEE 802.11a or IEEE 802.11g, the segment may be 3.2 microseconds. The segment can be longer or shorter depending on the channel frequency variation and frequency resolution of the channel training.

In some embodiments, the P users' signals (or spatial channels) may be separated in the frequency domain, tone by tone, using the previously formed Q×P channel matrixes and a frequency spatial demapper (e.g., using MMSE and zero-forcing techniques). The separated P signals may then be converted from the frequency domain into the time domain, segment by segment. At this point, the resulting P time domain signals may be synchronized and detected using conventional techniques.

For example, with respect to synchronization, in a conventional single user IEEE 802.11a system, the receiver may have knowledge of the structures of short preambles and long preambles. It may detect the presence of the short preambles. Then coarse synchronization may be performed at the end of the detection to search for boundaries between short preambles and between the last short preamble and the first long preamble. A coarse frequency offset estimation may also be performed. Thus, at about the same time, the receiver may also estimate the frequency offset between its oscillator clock and that of the transmitter. As noted previously, various embodiments may operate not only to separate asynchronous user signals, but also to separate users having different frequency offsets.

Figure 3:
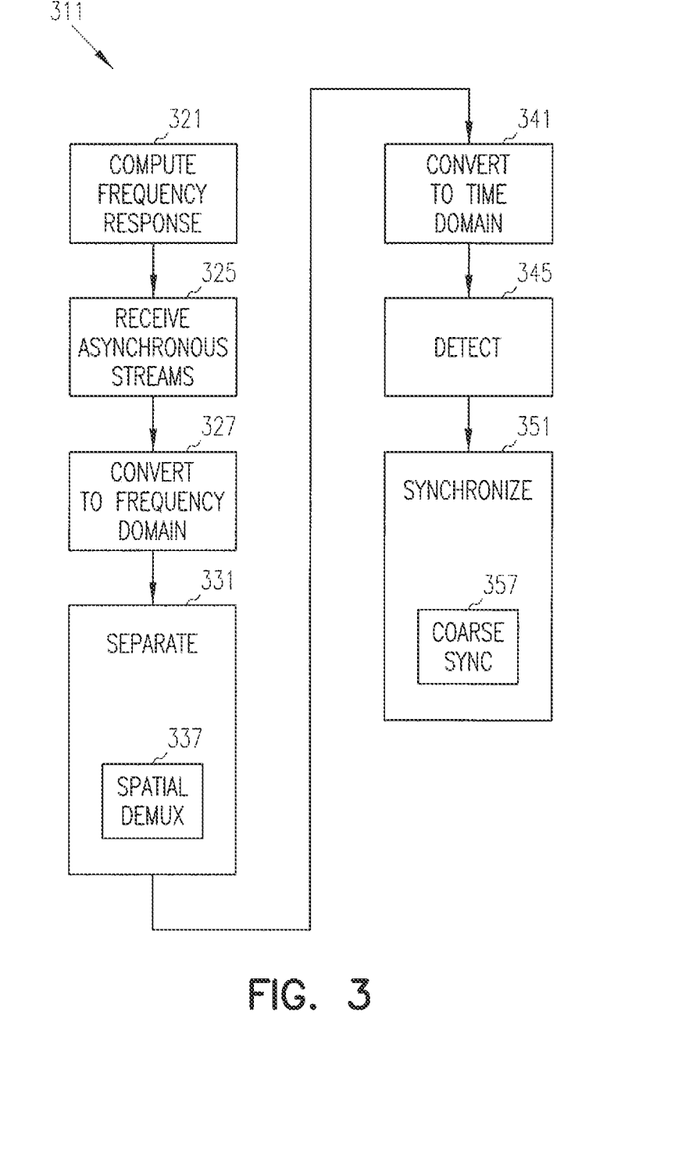
FIG. 3 is a flow chart illustrating several methods according to various embodiments.

FIG. 3 is a flow chart illustrating several methods according to various embodiments. In some embodiments of the invention, a method 311 may (optionally) begin with computing a frequency response for a number of channels corresponding to a plurality P of asynchronous data streams at block 321. The method 311 may continue with receiving, at substantially the same time, the combined plurality P of asynchronous data streams at a plurality Q of antennas at block 325. The method 311 may also include converting the combined plurality P of asynchronous data streams from the time domain into the frequency domain at block 327.

In many embodiments, the method 321 may include separating, in the frequency domain, the combined plurality P of asynchronous data streams received at substantially the same time into a separated plurality of data streams at block 331. In some embodiments, the method 311 may include separating the combined plurality P of asynchronous data streams into the separated plurality of data streams in the frequency domain using a frequency spatial demapper at block 337. It should be noted that it is possible for the number of the separated plurality of data streams to correspond directly to the number of wireless channels. One or more of the separated plurality of data streams may be formatted according to an IEEE 802.11 Standard. Separation may be performed by a wireless access point.

In some embodiments, the method 311 may include converting the separated plurality of data streams in the frequency domain into a separated plurality of data streams in the time domain at block 341. The method 311 may continue with detecting the separated data streams at block 345, and then synchronizing one or more of the separated plurality of data streams in the time domain at block 351. In some embodiments, the method 311 may include performing a coarse synchronization of at least one of the separated plurality of data streams after detecting the presence of a short preamble at block 357. At about the same time, a coarse frequency offset estimation may also be performed.

It should be noted that the methods described herein do not have to be executed in the order described, or in any particular order. Moreover, various activities described with respect to the methods identified herein can be executed in serial or parallel fashion. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment. Thus, other embodiments may be realized, as shown in FIG. 4.

Figure 4:
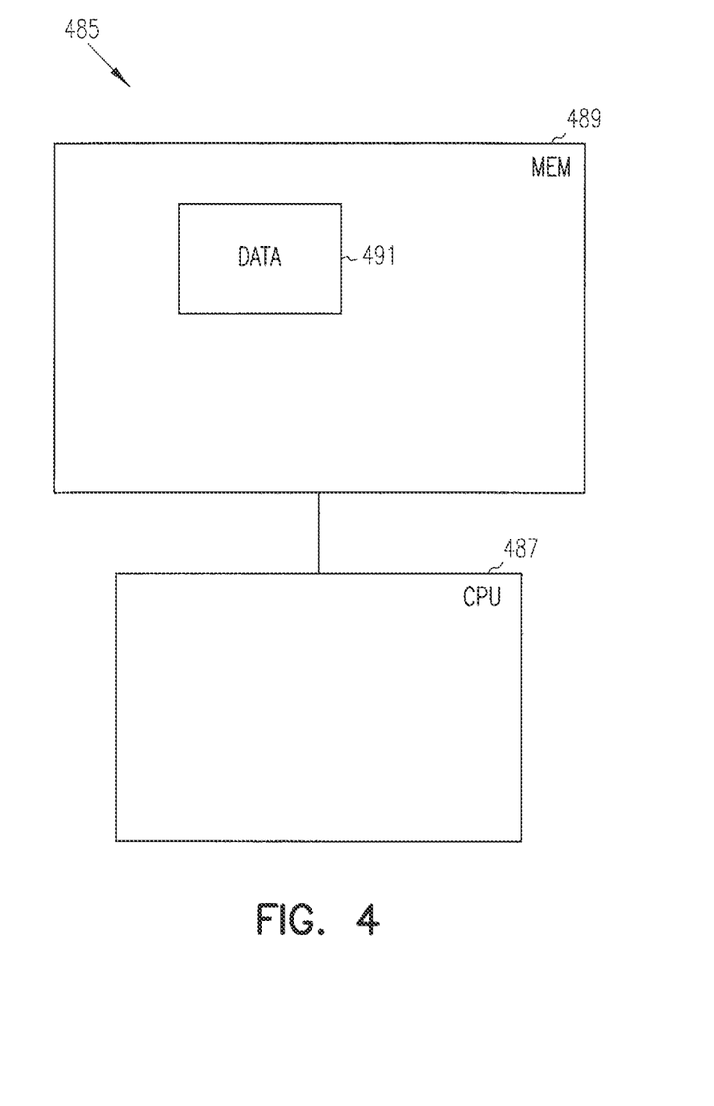
FIG. 4 is a block diagram of an article according to various embodiments.

FIG. 4 is a block diagram of an article 485 according to various embodiments, such as a computer, a memory system, a magnetic or optical disk, some other storage device, and/or any type of electronic device or system. The article 485 may comprise a processor 487 coupled to a machine-accessible medium such as a memory 489 (e.g., a memory including an electrical, optical, or electromagnetic conductor) having associated information 491 (e.g., computer program instructions, and/or other data), which when accessed, results in a machine (e.g., the processor 487) performing such actions as separating, in the frequency domain, a combined plurality P of asynchronous data streams received at substantially the same time into a separated plurality of data streams. The activity of separating may be performed by a wireless access point.

Other activities may include computing a frequency response for a number of channels corresponding to the plurality P of asynchronous data streams. In some embodiments, further activities may include converting the separated plurality of data streams in the frequency domain into a separated plurality of data streams in the time domain, as well as performing a coarse synchronization of at least one of the separated plurality of data streams after detecting the presence of a short preamble. At about the same time, a coarse frequency offset estimation may be performed.

Implementing the apparatus, systems, and methods described herein may result in providing an operational SDMA uplink when transmitting stations are not synchronized, or when the accuracy of synchronization is on the order of the CP time interval. Signals having different frequency and/or phase offsets may also be processed in a more reliable fashion. Less power may be required since there may be no need to synchronize clocks with high accuracy. At the same time, WLAN throughput may be increased by enabling transmission for multiple stations and reception with access points on a substantially simultaneous basis.

Although the inventive concept may be discussed in the exemplary context of an IEEE 802.11x implementation (e.g., IEEE 802.11a, IEEE 802.11g, IEEE 802.11 HT, etc.), the claims are not so limited. Indeed, embodiments of the present invention may well be implemented as part of any wireless system, including those conforming to various versions of the IEEE 802.16 standards, and/or using multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    computing, by a wireless access point, a channel matrix that is representative of a channel response for each of a plurality of channels, said computing based at least in part on training signals received over two or more antennas from multiple stations;
    receiving from multiple stations, at the wireless access point, a plurality of uplinked spatial division multiple access (SDMA) data streams that are out of synchronism;
    converting the plurality of SDMA data streams from a first time domain to a frequency domain;
    separating, with a spatial demapper, the plurality of SDMA data streams in the frequency domain into a separated plurality of data streams in the frequency domain based at least in part on the channel matrix;
    converting the separated plurality of data streams from the frequency domain to a second time domain; and
    synchronizing the separated plurality of data streams in the second time domain.

2. The method of claim 1, wherein the receiving comprises:
    receiving at least some of the plurality of SDMA data streams as data streams that include a plurality of non-aligned orthogonal frequency division multiplexed symbols.

3. The method of claim 1, wherein the receiving comprises:
    receiving the plurality of SDMA data streams in response to a polling communication.

4. The method of claim 3, wherein the polling communication comprises multiple polling messages overlapping in time and corresponding in number to the multiple stations.

5. The method of claim 1, wherein at least some of the separated plurality of data streams in the frequency domain have different frequency offsets.

6. The method of claim 1, wherein a number of the separated plurality of data streams correspond to a like number of wireless channels.

7. The method of claim 1, wherein at least two of the plurality of uplinked SDMA data streams are out of synchronism greater than 0.8 microseconds.

8. A non-transitory storage medium having instructions that, when executed, cause an apparatus to:
    compute a channel response for each of a plurality of channels based on training signals received over two or more antennas from multiple stations, the computed channel response to include at least a channel matrix;
    convert a plurality of spatial division multiple access (SDMA) data streams from a first time domain to a frequency domain after the plurality of SDMA data streams have been received as a plurality of uplinked SDMA data streams that are out of synchronism;
    separate the plurality of SDMA data streams in the frequency domain into a separated plurality of data streams in the frequency domain based on the channel matrix;
    convert the separated plurality of data streams from the frequency domain to a second time domain; and
    synchronizing the separated plurality of data streams in the second time domain.

9. The non-transitory storage medium of claim 8, wherein the instructions, when executed, cause the apparatus to separate the plurality of SDMA data streams at a wireless access point.

10. The non-transitory storage medium of claim 8, wherein the plurality of channels correspond in number to a number of the plurality of SDMA data streams.

11. The non-transitory storage medium of claim 8, wherein the instructions, when executed, cause the apparatus to:
    synchronize at least one of the separated plurality of data streams after detecting a boundary between preambles.

12. The non-transitory storage medium of claim 8, wherein the instructions, when executed, cause the apparatus to:
    estimate a coarse frequency offset between receiver and transmitter oscillator clocks.

13. An apparatus, including:
a separation module to separate a plurality of spatial division multiple access (SDMA) data streams into a plurality of separated data streams, in a frequency domain, after the plurality of SDMA data streams have been converted from a first time domain to the frequency domain, wherein the separation module is configured to separate the plurality of SDMA data streams in the frequency domain based at least in part on a channel matrix, and wherein the plurality of SDMA data streams have been received as a plurality of uplinked SDMA data streams that are out of synchronism; and
a synchronization module to synchronize the separated plurality of data streams in a second time domain after the separated plurality of data streams have been converted from the frequency domain to the second time domain.

14. The apparatus of claim 13, wherein the separation module comprises:
a spatial demultiplexer to provide the separated plurality of data streams.

15. The apparatus of claim 13, wherein the separation module comprises:
a module to perform a fast Fourier transform on the plurality of SDMA data streams.

16. The apparatus of claim 13, wherein the separation module comprises:
a module to perform an inverse fast Fourier transform on at least one of the separated plurality of data streams.

17. A system, comprising:
a separation module to separate a plurality of spatial division multiple access (SDMA) data streams into a plurality of separated data streams, in a frequency domain, after the plurality of SDMA data streams have been converted from a first time domain to the frequency domain, wherein the separation module is configured to separate the plurality of SDMA data streams in the frequency domain based at least in part on a channel matrix, and wherein the plurality of SDMA data streams have been received as a plurality of uplinked SDMA data streams that are out of synchronism;
a synchronization module to synchronize the separated plurality of data streams in a second time domain after the separated plurality of data streams have been converted from the frequency domain to the second time domain; and
a wireless access point coupled to a plurality of antennas to receive the plurality of SDMA data streams.

18. The system of claim 17, wherein the channel matrix is a Q×P matrix, the system further comprising;
a processor to form the Q×P channel matrix, wherein the plurality of antennas comprises Q antennas, and wherein the plurality of SDMA data streams comprises P data streams.

19. The system of claim 17, wherein the wireless access point is to train at least one channel for at least some of a plurality of stations associated with the plurality of SDMA data streams.

20. The system of claim of claim 17, wherein the plurality of SDMA data streams have been received as a plurality of uplinked SDMA data streams that are out of synchronims by a time period greater than an allowed guard band time period.

* * * * *